3,058,801
PRODUCTION OF HAFNIUM-FREE ZIRCONIUM COMPOUNDS
Roger L. Pilloton, Niagara Falls, N.Y., assignor to Union Carbide Corporation, a corporation of New York
No Drawing. Filed June 18, 1958, Ser. No. 742,712
3 Claims. (Cl. 23—23)

This invention relates to a method of obtaining pure hafnium-free zirconium compounds from materials containing compounds of both elements.

The most important commercial sources of zirconium are the silicate, zircon, and the oxide, baddeleyite. These minerals, in company with all other naturally occurring zirconium compounds, contain small, but significant quantities of hafnium. Zirconium and hafnium have very similar properties, both chemical and physical, and for normal commercial purposes it is not important to obtain the zirconium free from the hafnium. Zirconium however, has a very low thermal-neutron absorption rate, whereas hafnium has a very high one, about 600 times as great as that of zirconium. Consequently, zirconium is a very useful material of construction in nuclear reactors, for which purpose it must be substantially free from hafnium.

Previous methods for the separation of hafnium and zirconium have involved multistage fractionations and are, consequently, very slow or expensive. Known methods for fractional crystallization and precipitation require hundreds of steps and give poor yields. Fractional distillation of the chloride-phosphorus addition compounds must be carried out in corrosion-resistant equipment at high temperatures and produces phosphorus-zirconium compounds which are very difficult to transform into pure zirconium metal. Liquid-liquid extraction methods have also been tried, but the only published methods of any importance involve extraction from nitric or perchloric acid solutions with ketones or alkyl phosphates. These reagents form explosive mixtures, are highly corrosive, and extremly difficult to handle. The organic reagents used in these processes are normally expensive.

Accordingly, there is a demand for an improved process for recovering hafnium-free zirconium compounds, readily convertible to pure zirconium metal, from materials containing compounds of both zirconium and hafnium.

It is the principal object of this invention to satisfy this demand. More specifically, it is an object of the invention to provide a process for the production of a hafnium-free zirconium compound from materials containing zirconium and hafnium compounds. A related object of the invention is the production of a high-grade hafnium concentrate from such materials.

These objects are achieved by the invention which is a process comprising the steps of dissolving zirconium and hafnium tetrachlorides in an oxygenated organic liquid selected from the group consisting of esters, ketones and ethers which form addition compounds with said tetrachlorides; cooling the solution to a temperature in the range 0° C. to −50° C. and precipitating the hafnium values from the solution as hafnium oxychloride by the addition of concentrated hydrochloric acid thereto. Upon separation of the halfnium oxychloride precipitate from the remaining solution, zirconium oxychloride is precipitated by adjustment of the quantity of water and hydrochloric acid therein. The zirconium oxychloride, which is substantially free of hafnium compounds can be converted to zirconium chloride and then to zirconium metal by conventional procedures.

As employed herein, the term "oxygenated organic liquid which forms addition compounds with said tetrachlorides" refers to compounds which form by the reaction of zirconium tetrachloride and hafnium tetrachloride with the oxygenated organic liquid and which are in solution in an excess of the organic liquid. These addition compounds are believed to be of the type $ZrCl_4 \cdot 2HCOOR$ and $HfCl_4 \cdot 2HCOOR$. It is believed that two molecules of the solvent are attached to each molecule of zirconium or hafnium tetrachloride.

The basic reactions believed to occur are the hydrolyses of zirconium and hafnium tetrachlorides which may be represented by the following equation:

$ZrCl_4 \cdot 2HCOOR + 9H_2O$
$\rightarrow ZrOCl_2 \cdot 8H_2O + 2HCOOR + 2HCl$
$HfCl_4 \cdot 2HCOOR + 9H_2O$
(soluble)
$\rightarrow HfOCl_2 \cdot 8H_2O + 2HCOOR + 2HCl$
(insoluble)

Because these equations represent equilibria which have different stabilities and because the hafnium compound is hydrolyzed first, it is possible to precipitate hafnium from a solution containing both hafnium and zirconium as described hereinabove.

The selection of an organic liquid for use in the method of the invention may be based on a consideration of the "separation factor" obtained with it. The separation factor is the quotient of the ratio of hafnium to zirconium in the precipitate divided by the ratio of hafnium to zirconium in the filtrate after addition of hydrochloric acid to the organic solution in such quantity as to produce a very small precipitate in comparison to the total quantity of extractable material present. For example, if the ratio of hafnium to zirconium in the precipitate obtained by addition of hydrochloric acid to the organic solution were 12 to 1, and the ratio of hafnium to zirconium in the filtrate were 2 to 1, the separation factor for that organic liquid would be 12 divided by 2, or 6.

A large number of organic liquids have been used in the method of the invention. These include ethyl, methyl, butyl, and propyl formates and acetates, ethyl ketone, propyl ketone, methyl ethyl ketone; and dichloro ethyl ether. Among the suitable organic liquids are the esters of a monohydroxy alcohol and an organic acid, which esters have 2 to 10 carbon atoms. Separation factors of a number of these have been determined and are tabulated below:

| Compound: | Separation factor |
|---|---|
| Methyl formate | 2 |
| Ethyl formate | 4 |
| n-Propyl formate | 6 |
| n-Butyl formate | 4 |
| Amyl formate | 3 |
| Hexyl formate | 2 |
| Isopropyl formate | 1.8 |
| Isobutyl formate | 2.1 |
| Ethyl acetate | 2 |
| Isopropyl acetate | 2.9 |
| Diethyl oxalate | 2.2 |
| Diisobutyl ketone | 2 |
| Dichloroethyl ether | 2 |

By reason of their relatively high separation factors, n-propyl formate and n-butyl formate are preferred organic liquids for use in the invention.

The process of the invention will be more clearly understood from the following detailed description. Zirconium tetrachloride, which as commercially obtained, usually contains between 2% and 5% by weight of hafnium tetrachloride, is treated at room temperature with the selected organic liquid. The impure salt dissolves almost instantly by forming addition compounds with the organic liquid. The solution obtained contains between 50 and 250 grams of tetrachloride per liter, but this concentration range is not critical. Heat is evolved during the formation of the hafnium and zirconium addition compounds with the organic solvent. The solution is cooled to below room temperature, the exact temperature depending upon which organic liquid is used, and upon the concentrations of zirconium and hafnium of the feed solution, the higher the concentrations, the less cooling required. Generally, the solution should be cooled at least to 0° C. but need not be colder than −50° C.

The cooled solution preferably is allowed to stand for at least 24 hours and is then treated with aqueous hydrochloric acid solution in an amount and concentration sufficient to decompose the hafnium complex together with some of the zirconium addition compound and to form a halfnium-rich crystalline deposit. In general, the concentration of hydrochloric acid used varies directly with the concentration of the feed solution and with the purity required for the final zirconium product. Thus, for example, the addition of 25% by volume of 37% hydrochloric acid to a solution containing 70 grams per liter of zirconium tetrachloride in which the hafnium to zirconium ratio is 0.023 is sufficient to precipitate enough halfnium to leave a zirconium solution in which the hafnium-to-zirconium ratio is 0.001, but twice this much acid would be required to leave a solution in which the hafnium-to-zirconium ratio of 0.0001. The separation efficiency increases with the acid concentration and best results are obtained with acidities on the order of 37% by weight hydrochloric acid. It has been found that above a hydrochloric acid concentration of about 37% by weight little or no precipitation of hafnium oxychloride occurs, while below a hydrochloric acid concentration of about 30% by weight zirconium tends to be precipitated as the oxychloride.

The precipitate produced by the acid addition is filtered or centrifuged off and may be recirculated through the process to recover the zirconium it contains, or used as a halfnium-rich concentrate for the extraction of hafnium. The organic solution after the precipitation of the hafnium contains less than 0.1% hafnium. The zirconium is precipitated from the organic solution as the oxychloride by lowering the concentration of hydrochloric acid therein by the addition of water, or dilute hydrochloric acid. Both the organic liquid and the hydrochloric acid can be recycled.

The process is illustrated by the following example of a preferred method of obtaining a pure zirconium compound. The source material was commercial zirconium tetrachloride containing 1.6% hafnium chloride which gives a hafnium-to-zirconium metal ratio of 0.023. Seven grams of the tetrachloride were dissolved in 100 cc. of butyl formate at room temperature. The solution obtained, which had a concentration of seventy grams of tetrachloride per liter, was cooled to −30° C. Twenty-five cc. of 37% of weight hydrochloric acid were added in drops over a period of 30 minutes and the mixture agitated for 15 minutes, keeping the temperature at −30° C. A crystalline precipitate separated out which, on analysis, showed a hafnium-zirconium ratio of 0.045. The precipitate was filtered off, leaving a solution containing zirconium with a hafnium/zirconium ratio of 0.001. The zirconium was precipitated from the solution by the addition of dilute hydrochloric acid. The precipitate contained less than 0.1% hafnium.

Thus, an effective separation of zirconium from hafnium is obtained by the method of the invention with good recovery of both metals.

This application is a continuation-in-part of copending application Serial No. 599,013, filed July 20, 1956, now abandoned.

I claim:
1. Process for recovering a zirconium compound substantially free from hafnium compounds from tetrachlorides of zirconium and hafnium, which process comprises dissolving such material in an oxygenated organic liquid selected from the group consisting of n-propyl formate and n-butyl formate; cooling the organic liquid solution so prepared to a temperature in the range 0° C. to −50° C.; acidifying the organic liquid solution by adding thereto a concentrated aqueous hydrogen chloride solution containing between about 30 percent and about 37 percent hydrogen chloride by weight, said hydrogen chloride solution being in an amount sufficient to cause precipitation of substantially all of the dissolved hafnium values as hafnium oxychloride; separating the precipitate so formed from the organic liquid and hydrogen chloride solutions; and subsequently diluting the added aqueous solution of hydrogen chloride with water to precipitate the dissolved zirconium values in the form of zirconium oxychloride substantially free from hafnium.

2. Process for recovering a zirconium compound substantially free from hafnium compounds from tetrachlorides of zirconium and hafnium, which process comprises dissolving such material in n-propylformate; cooling the organic liquid solution so prepared to a temperature in the range 0° C. to −50° C.; acidifying the organic liquid solution by adding thereto a concentrated aqueous hydrogen chloride solution containing between about 30 percent and about 37 percent hydrogen chloride by weight, said hydrogen chloride solution being in an amount sufficient to cause precipitation of substantially all of the dissolved hafnium values as hafnium oxychloride; separating the precipitate so formed from the organic liquid and hydrogen chloride solutions; and subsequently diluting the added aqueous solution of hydrogen chloride with water to precipitate the dissolved zirconium values in the form of zirconium oxychloride substantially free from hafnium.

3. Process for recovering a zirconium compound substantially free from hafnium compounds from tetrachlorides of zirconium and hafnium, which process comprises dissolving such material in n-butyl formate; cooling the organic liquid solution so prepared to a temperature in the range 0° C. to −50° C.; acidifying the organic liquid solution by adding thereto a concentrated aqueous hydrogen chloride solution containing between about 30 percent and about 37 percent hydrogen chloride by weight, said hydrogen chloride solution being in an amount sufficient to cause precipitation of substantially all of the dissolved hafnium values as hafnium oxychloride; separating the precipitate so formed from the organic liquid and hydrogen chloride solutions; and subsequently diluting the added aqueous solution of hydrogen chloride with water to precipitate the dissolved zirconium values in the form of zirconium oxychloride substantially free from hafnium.

References Cited in the file of this patent

UNITED STATES PATENTS

| | | |
|---|---|---|
| 2,566,665 | Huffman et al. | Sept. 4, 1951 |
| 2,757,081 | Hure et al. | July 31, 1956 |

OTHER REFERENCES

Mellor, J. W.: "A Comprehensive Treatise on Inorganic and Theoretical Chemistry," vol. 7, Longmans, Green and Co., New York, 1927, page 172.

Hummers et al.: "Journal of American Chemical Society," vol. 74, January 1952, pages 139–141.